Patented June 13, 1939

2,162,027

UNITED STATES PATENT OFFICE 2,162,027

PLASTICIZATION OF CELLULOSE ETHERS

Irving E. Muskat, Akron, Ohio, assignor to Pittsburgh Plate Glass Company, Allegheny County, Pa., a corporation of Pennsylvania No Drawing. Application August 31, 1937, Serial No. 161,797

7 Claims. (Cl. 23—240)

The present invention relates to cellulose ether compositions and it has particular relation to cellulose ether compositions which are to be used in the formation of chemically resistant films.

It is commonly recognized that alkali metal hydroxides are corrosive and, when brought into contact with metallic equipment, such as iron vessels, vigorously attack the surfaces thereof. This results in contamination of the alkali hydroxide with metallic impurities which is particularly objectionable when substantially pure hydroxide of high concentration is desired. In accordance with my invention, I have been able to provide a chemically resistant coating composition which, when applied to metallic surfaces which are normally exposed to chemical attack, forms plastic, flexible, wear resistant films capable of inhibiting the pick up of metallic impurities by the said hydroxides, particularly concentrated aqueous solutions of these hydroxides.

In a copending application of William F. Waldeck, Serial No. 103,784, now Patent 2,111,342 granted March 15, 1938, it is noted that cellulose ethers such as ethyl cellulose are highly resistant to concentrated caustic soda liquors and may be used for coating or forming containers or apparatus employed in connection with such liquors.

In order to improve its workability, flexibility, and other characteristics of the cellulose ether it is desirable to incorporate with it plasticizers which have functions similar to those employed in nitrocellulose and other film-forming resinlike bodies. However, great difficulty has heretofore been experienced in the provision of a plasticizer which was completely satisfactory for all purposes. In some instances the plasticizers were not compatible with the ether or possessed only feeble plasticizing powers or were too volatile or were too soluble in water to be sufficiently permanent. In every instance the resistance of the plasticizer to strong chemical agencies of the type of concentrated sodium hydroxide encountered in caustic containers was less than could be desired.

In accordance with the present invention, I have found that alkylated naphthalenes of the type of monoamyl and diamyl naphthalene possess excellent plasticizing power for cellulose ethers for practically all purposes, including even use as resistant coatings in containers for highly concentrated caustic soda.

The preparation of cellulose ethers and notably ethyl cellulose which may be employed in practicing the present invention is conventional and description thereof is not deemed to be necessary. The same is also true of the alkylated naphthalenes. In the preparation of a plasticized cellulose ether composition in accordance with the provisions of the present invention, for use as a varnish a cellulose ether such as ethyl cellulose and the alkylated naphthalene are dissolved together in a solvent by common methods of milling or dispersing. Since the solvent does not constitute a permanent part of the material it is obvious that practically any solvent material for the cellulose ether may be employed in the preparation of films suitable for the purposes of the present invention. The following constitutes an example of a solvent mixture which may be employed:

| | Parts |
|---|---|
| Alcohol | 21.5 |
| Xylene | 46.2 |
| Acetate of monomethyl ether of ethylene glycol | 6.5 |
| Toluene | 25.8 |

Ethyl cellulose, methyl cellulose, benzyl cellulose or similar cellulosic ether or mixtures of two or more thereof may be incorporated with this solvent in suitable amount to obtain a desired consistency. In general it is desirable to incorporate as much of the cellulosic material as can be done without undue increase of the viscosity of the solution. About 6 to 15% of ethyl cellulose may usually be employed. However, this proportion is susceptible of considerable variation either upwardly or downwardly.

The amount of alkylated naphthalene required in the composition will of course depend upon the degree of flexibility desired in the final films, but about 10 to 30% based upon the weight of the ethyl cellulose used is usually satisfactory; however any substantial amount within the limits of compatibility is contemplated.

Pigmentary bodies and fillers may be incorporated into the solutions, but if the material is to be employed in coating containers for concentrated caustic they should of course be relatively inert. Ground mica and asbestos are found to be sufficiently inert for use in such compositions. The pigment may be employed in any desired proportion, but about 10 to 40% is found by experience to give good results. Where caustic resistance is not required, almost any pigments or fillers may be employed.

Application of the composition to exposed surfaces may be effected by such conventional methods as brushing, spraying, spreading, roll-coating, dipping, or the like. The coating of iron or steel tank cars and other forms of containers offers a relatively broad field of application of the invention, but it is to be understood that the coating of other materials and objects is also contemplated. For example, it may be desirable to coat aluminum, zinc, glass, porcelain, rubber or wood with the composition. The new composition is also susceptible of molding under heat and pressure by conventional methods. When the material is employed for molding purposes it may also be incorporated with various filler materials.

Films may be formed by a single application of the varnish, but usually it is desirable to make a plurality of applications—e. g. 6 or 7 with sufficient time between applications to admit of partial or complete evaporation of the solvent.

Alkylated naphthalenes comprise a fairly extensive group of chemical compounds and include in addition to the amylated naphthalenes homologues such as propylated, butylated, hexalated, cyclohexalated benzylated and similar compounds in which the side chains may be normal or branched and may be one or more in number. In some cases these may be substituted for the amyl naphthalene herein more specifically discussed. Additions of other plasticizers such as chlorinated diphenyl, and diamyl phthalates in varying amounts, for example, 10 to 50% to amyl or other alkyl naphthalenes to cellulose ethers is contemplated. The substitution of other cellulose ethers such as butyl cellulose, propyl cellulose, methyl cellulose or aromatic ethers such as benzyl cellulose, ethyl benzyl cellulose and the like is also included. The compounding of these various materials follows along the lines above discussed.

Films prepared in the foregoing manner possess gloss substantially superior to that of unplasticized films, which is desirable where the films are to be used for decorative purposes; they are also flexible and adhere excellently to wood, metals, and other materials; likewise they are highly impermeable to moisture. All of these properties are retained with remarkable permanence even under very adverse conditions.

Probably few if any requirements placed upon a varnish are more severe than those encountered when it is used to protect surfaces exposed to the action of concentrated soda liquors. At concentrations of 10 or 12 per cent it is not particularly corrosive, but upon evaporation in order to reduce the volume sufficiently to admit of satisfactory economical storage and shipment and use, it rapidly becomes extremely corrosive. At concentrations of about 50% and above it will attack almost all known materials including the relatively resistant metals. Even nickel and noble metals such as silver are not entirely resistant to its action. As for common metal such as iron which may be economically feasible for use in the manufacture of containers for caustic the corrosive action is such that concentrated caustic will quickly pick up quantities of iron sufficient to be objectionable to users of the caustic in many fields. Particular difficulty has been experienced in the rayon industry because in the latter, even relatively small percentages of iron are highly objectionable. In this industry it is found difficult to store and ship liquors even of the highest initial purity without objectionable pick-up of iron from the containers.

As a result of difficulties encountered in preserving concentrated caustic soda liquors from contamination by reason of absorption of iron from the containers considerable effort has been expended by caustic manufacturers or dealers in an attempt to develop a material which could be applied easily and inexpensively to the interiors of conventional tank cars or other metallic containers employed in storing and shipping the liquors. In this search practically all of the known artificial plastic materials such as are employed in the preparation of paints and varnishes have been investigated. Most of the materials have failed completely or when exposed to the action of concentrated caustic have shown only a very moderate degree of resistance to its action. In most instances oxidation or some other form of decomposition soon so reduced the flexibility and adhesive characteristics of the film as to result in rapid scaling and failure.

In co-pending application Serial No. 103,784, previously referred to, the use of cellulose ethers and notably ethyl cellulose for coating containers employed for storing and shipping concentrated caustic is disclosed. Cellulose ethers exhibit a remarkable resistance to the action of even the most concentrated caustic. For example, ethyl cellulose films upon iron have been found to be practically perfectly resistant to caustic. Even after exposure for periods of five months or more no detectable failure of the film can be noted. Under similar conditions conventional coating material such as linseed oil, cellulose esters, bituminous paints, vinyl resins, bakelite varnishes, chlorinated rubber, rubber polymers, etc. failed within a period of from a few minutes to thirty days. However, plasticization of ethyl cellulose in this field is peculiarly difficult. When employed in films so thin as not to require plasticization it is remarkably resistant, but if it is employed in relatively heavy films or in molded objects, it is desirable to combine it with a plasticizer. Unfortunately it is found that conventional plasticizers are not satisfactory in connection with this particular material. Plasticizers which are excellent for ordinary types of resin when introduced into ethyl cellulose or similar cellulose ether, like the conventional coating materials, will not successfully withstand intensive chemical action such as is encountered in connection with the concentrated caustic. In contradistinction, alkylated naphthalenes such as amyl or diamyl naphthalenes are practically as resistant to caustic solutions of a concentration of 50% and above, as cellulose ethers themselves, and may successfully be employed to plasticize relatively thick films and molded articles which are exposed to concentrated caustic. The plasticized films adhere with great tenacity to iron or steel, even in the presence of highly concentrated caustic (50% or above) at temperatures upward of 100° C.

The resistance of the cellulose ethers such as ethyl cellulose when plasticized with amyl naphthalene or similar alkyl naphthalene to the action of concentrated caustic is outstanding and highly surprising. However, the material, within itself, is thought to be novel and it is susceptible of wide application. For example, it is resistant to dilute caustic and it is highly acid resistant as well as caustic resistant and may be employed in coating containers and other apparatus that contacts with sulphuric, hydrochloric or other acids and corrosive materials. The use of the material for coating industrial frames and structures which are exposed to the action of chemical vapors and mists is contemplated. An additional field of application involves the coating of tin cans for foods and other materials.

Use as a decorative and weather resistant medium for coating dwellings and other structures constitutes an additional field of application.

What I claim is:

1. A method of preventing metal pick up by an alkali metal hydroxide in a metallic container which comprises coating the inner surface of said container with an ether of cellulose admixed with an alkyl naphthalene.

2. A method of preventing contamination of an alkali metal hydroxide by a metal with which it is in contact, which comprises coating the metal surface to be exposed to said alkali metal hydroxide with an ether of cellulose plasticized with an alkyl naphthalene.

3. A method of preventing contamination of an alkali metal hydroxide by a metal with which it is in contact, which comprises coating the metal surface to be exposed to said alkali metal hydroxide with ethyl cellulose plasticized with an alkyl naphthalene.

4. A method as defined in claim 3 in which the alkyl naphthalene is an amyl naphthalene.

5. An article of manufacture comprising a metallic receptacle containing an alkali metal hydroxide and a corrosion-resisting coating covering the surface of said receptacle which is in contact with the hydroxide, said coating comprising a cellulose ether and an alkyl naphthalene.

6. An article of manufacture comprising a metallic receptacle containing an alkali metal hydroxide and a corrosion-resisting coating covering the surface of said receptacle which is in contact with the hydroxide, said coating comprising ethyl cellulose and an alkyl naphthalene.

7. An article of manufacture comprising a metallic receptacle containing an alkali metal hydroxide and a corrosion-resisting coating covering the surface of said receptacle which is in contact with the hydroxide, said coating comprising ethyl cellulose and an amyl naphthalene.

IRVING E. MUSKAT.